US008068738B2

(12) United States Patent
Yefim

(10) Patent No.: US 8,068,738 B2
(45) Date of Patent: Nov. 29, 2011

(54) SYSTEM AND METHOD FOR DECODING INFRA-RED (IR) SIGNALS

(75) Inventor: Vayl Yefim, Carmel, IN (US)

(73) Assignee: TTE Technology, Inc., Indianapolis, IN (US)

( * ) Notice: Subject to any disclaimer, the term of this patent is extended or adjusted under 35 U.S.C. 154(b) by 1317 days.

(21) Appl. No.: 11/708,894

(22) Filed: Feb. 21, 2007

(65) Prior Publication Data

US 2008/0198273 A1 Aug. 21, 2008

(51) Int. Cl.
*H04B 10/06* (2006.01)

(52) U.S. Cl. ........................................ 398/106; 398/202

(58) Field of Classification Search .......... 398/106–107, 398/202

See application file for complete search history.

(56) References Cited

U.S. PATENT DOCUMENTS 6,407,840 B1 6/2002 Shien-Te et al.
6,426,887 B2 7/2002 Nagai et al.
6,496,390 B2 12/2002 Yang
6,659,873 B1 * 12/2003 Kitano et al. .................. 463/42
6,810,216 B1 10/2004 Tourunen
6,914,527 B2 7/2005 Hsu
6,944,402 B1 * 9/2005 Baker et al. .................. 398/128

FOREIGN PATENT DOCUMENTS

EP 1111754 A2 6/2001
JP 2003125312 A 4/2003
KR 10-2006-0059655 A 6/2006
WO WO03073755 A1 9/2003
WO WO2006011032 A1 2/2006

OTHER PUBLICATIONS

PCT International Search Report and the Written Opinion of the International Searching Authority, mailed Jul. 29, 2008.

* cited by examiner

*Primary Examiner* — Leslie Pascal
(74) *Attorney, Agent, or Firm* — Fletcher Yoder, P.C.

(57) ABSTRACT

The disclosed embodiments relate to an electronic device configured to receive infra red (IR) signals. The electronic device comprises a first IR decoder configured to decode the IR signals when the electronic device is operating in a first power mode, and a second IR decoder configured to decode the IR signals when the video unit is operating in a second power mode.

20 Claims, 3 Drawing Sheets

SYSTEM AND METHOD FOR DECODING INFRA-RED (IR) SIGNALS

FIELD OF THE INVENTION

The present invention relates to infra-red (IR) decoders used in electronic devices, such as televisions (TVs), digital versatile video recorders (DVDRs), video cassette recorders (VCRs), computers, personal digital assistants (PDAs), video cameras, cell phones and so forth.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic devices, such as the devices mentioned above, may be controlled remotely by a remote device, typically known as a remote control. A remote control conveniently enables a user to access the electronic device from a distance so that the user may, for example, change settings and configurations of the electronic device otherwise requiring the user to physically access the electronic device. Controlling the electronic device from a distance is achieved by transmission of IR burst/signals from the remote control to the electronic device. Such IR bursts contain encoded information corresponding to commands and/or functions prompting the electronic device, from a distance, to execute user-desired functionalities. Upon reception by the electronic device, the IR signals transmitted by the remote control undergo processing by dedicated circuitry and/or software disposed within the electronic device so as to decode the information contained in the IR signals. Thereafter, the decoded information may be forwarded to a main processor of the electronic device so that the commands and/or functions may be executed accordingly.

Hardware and/or software components used in implementing IR decoders, such as in TVs, DVDRs, etc., are powered by a main power supply disposed within such aforementioned devices. Particularly, during periods of time when the electronic device is turned off, the IR decoder may remain powered so that it can switch the electronic device back on when prompted by the remote control operated by the user. Further, known electronic devices may power the IR decoder contained therein during periods of time when the electronic device is not operating with the same amount of power otherwise used for powering the device when it is fully operating. Consequently, in such periods of time, which can be long, the IR decoder may consume large amounts of electrical power while the electronic device is turned off. As a result, the IR decoders may unnecessarily consume electrical power, further rendering such electronic devices non-compliant with various industry standards requiring low consumption of power by IR decoders when the electronic device does not operate.

SUMMARY OF THE INVENTION

The disclosed embodiments relate to an electronic device configured to receive infra red (IR) signals, comprising a first IR decoder configured to decode the IR signals when the electronic device is operating in a first power mode; and a second IR decoder configured to decode the IR signals when the video unit is operating in a second power mode.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
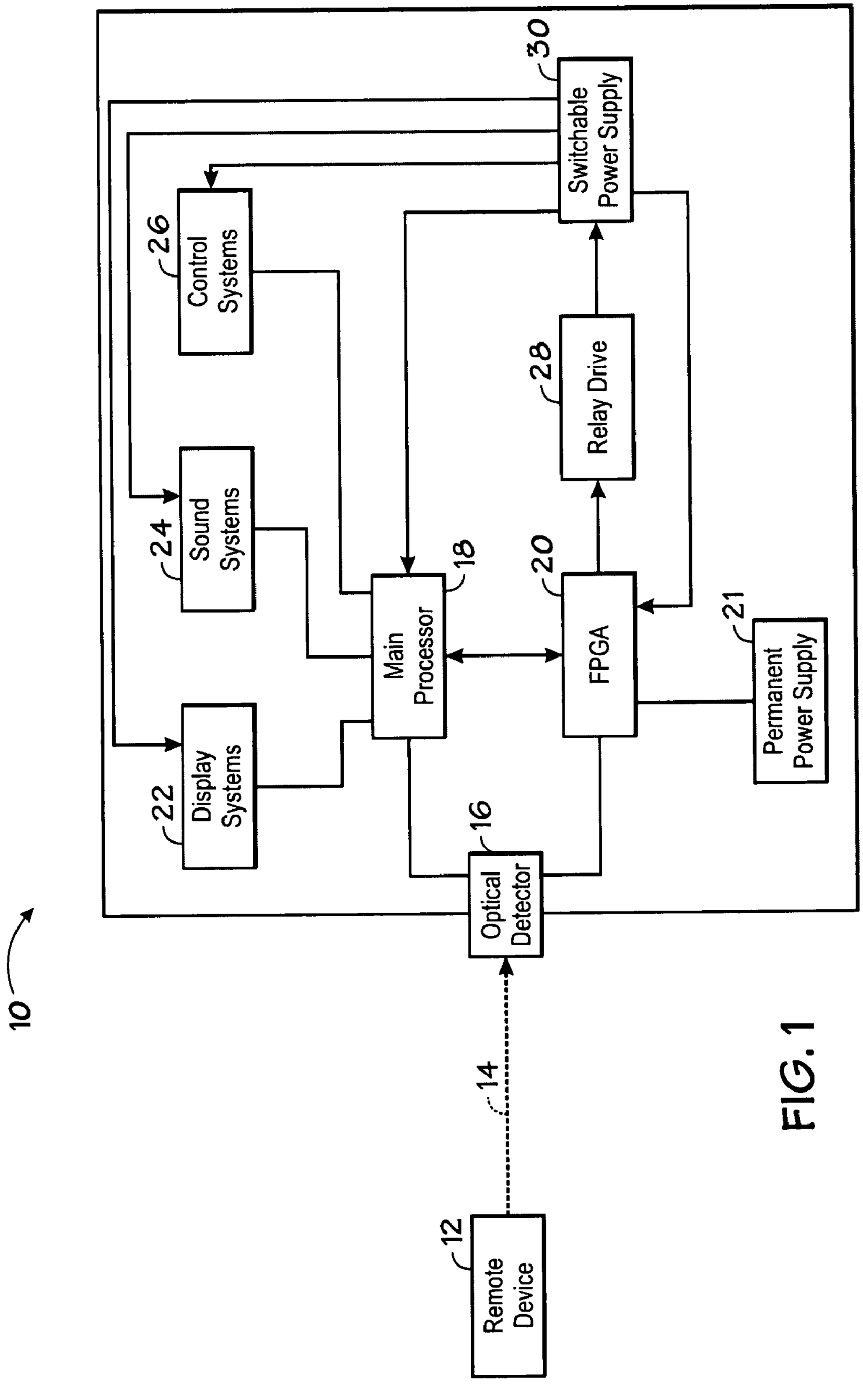
FIG. 1 is a schematic diagram of a remotely operated electronic device in accordance with an exemplary embodiment of the present invention.

FIG. 1 is a schematic diagram of a remotely operated electronic device 10 in accordance with an exemplary embodiment of the present invention. The electronic device 10 may be a TV, computer, DVDR, VCR, PDA, video cameras, cell phone or the like. The device 10 is controlled by a remote device 12, such as a remote control, configured to transmit IR signals 14 to the electronic device 10. The IR signals 14 emitted by the remote control 12 encode various operational commands and functions enabling, for example, a user to switch the device 10 on and off, change the channels of the device 10 and/or control other settings and features of the device 10, that is, features and configurations normally incorporated in the previously mentioned electronic devices.

As further depicted in FIG. 1, the electronic device 10 is formed of various circuits and devices adapted to intercept, process and execute incoming IR signals emitted by the remote control 12. Accordingly, the electronic device 10 is formed of an optical detector 16, such as a photodetector, adapted to receive the IR signals 14 and convert such optical signals into electrical signals so that these may be forwarded for processing by additional hardware of the electronic device 10. The electronic device 10 further includes a main processor 18 and field programmable gate arrays (FPGA) 20, both of which may be connected to the detector 16. The main processor 18 may be coupled to other systems included in the electronic device 10, including display systems 22, sound systems 24 and control systems 26. When the electronic device 10 is fully operational, i.e., turned on, the main processor 18 receives and processes encoded IR commands which control the systems 22-26. For example, where the electronic device 10 is a TV, main processor 18 may process certain commands received from the remote control 12 to control the TV's brightness and/or sound pitch as provided by the display and sound systems 22 and 24, respectively. Where the electronic device is, for example, a VCR the main processor 18 may process rewind and forward commands received by the remote control 12 to prompt the control system 26 for operating the rewinding/forwarding wheel of the VCR accordingly.

The FPGA 20 are formed of programmable logic blocks and programmable interconnects typically formed of semiconductor devices. The FPGA 20 may be programmable to emulate the functionality of basic logic gates such as AND, OR, XOR, NOT or more complex combinational functions such as decoders or math functions. The FPGA 20 may also include memory elements, which may be simple flip-flops or complete blocks of memories. In the illustrated embodiment, main processor 18 and FPGA 20 are adapted to implement an IR decoder whose functionality is split between the main processor 18 and the FPGA 20 when the electronic device is turned on/off, respectively. Such an implementation of an IR decoder enables the electronic device 10 to consume low amounts of power while it is turned off. While in the illustrated embodiment the FPGA 20 are shown as a separate component from main processor 18, other embodiments may have FPGA 20 incorporated with the main processor of the device. It should further be noted that the FPGA 20 may be adapted to perform numerous operations, many of which may be active during periods of time when the electronic device is turned on and, some of which may be unrelated to the operation of the present IR decoder.

The FPGA 20 are coupled to a permanent power supply 21 configured to supply constant power to the FPGA 20 during their operation. During periods of time in which the device 10 is turned off and low power mode FPGA IR decoding is enabled, permanent power supply 21 provides the low but sufficient power to those components of the FPGA 20 implementing IR decoding. When the device 10 is turned on, switchable power supply 30 may provide additional power to the FPGA 20 to enable their complete operation.

The electronic device 10 further includes a relay drive 28 connected to the FPGA 20 and to a switchable power supply 30. The swithcable power supply 30 is connected to the main processor 18. During periods of time in which the electronic device 10 is turned on, the switchable power supply 30 is configured to supply power to the main processor 18, as well as to other systems contained within the electronic device 10, such as the systems 20 and 22-26. Similarly, during periods of time when the electronic device 10 is off, no power is delivered to the main processor 18 and to the systems 22-26 as the power supply 30 is disconnected from those components. Such switching capabilities of power supply 30 are controlled by the relay drive 28.

The components of the electronic device 10, as described above, form an IR decoder whose function is split between the FPGA 20 and the main processor 18. Such a splitting occurs as the device 10 transitions between on/off states. For example, when device 10 is switched off remotely, the remote control 12 emits the IR signals 14 which are intercepted by the detector 16 and are forwarded as electrical signals to the main processor 18 and to the FPGA 20. Such IR signals encode a command disconnecting the main processor 18 and systems 22-26 from the power supply 30 while powering portions of the FPGA 20 configured to function as the IR decoder when the electronic device 10 is switched off. Accordingly, circuit blocks within the FPGA 20 designated for IR decoding are adapted to consume low amounts of power such that the overall consumption of power by the electronic device 10, when switched off, is low as well. As a result, such a configuration may render the electronic device 10 complaint with present industry standards, one of which is known as "Energy Star," an industry standard requiring electronic devices employing IR decoders to consume low amounts of power.

Similarly, when the electronic device 10 is switched on, the remote control 12 emits IR signals 14 encoding commands and/or functions enabling the relay drive 28 to connect the power supply 30 to the main processor 18, while providing additional power to the FPGA 20. At that instant, the main processor 18 takes over all IR decoding functionalities for decoding most commands and/or functions received from the remote control 12 when the electronic device 10 is switched on. It should be born in mind that implementing FPGA IR decoding, as described below in FIG. 2, requires no additional hardware and/or software on top of what is normally included in electronic devices, such as those mentioned above. Thus, to the extent existing FPGA (e.g., FPGA 20) of an electronic device (e.g., electronic device 10) are configurable for IR decoding, the present technique does not require any additional components to be added to the electronic device 10 that normally would not be included in such a device.

Figure 2:
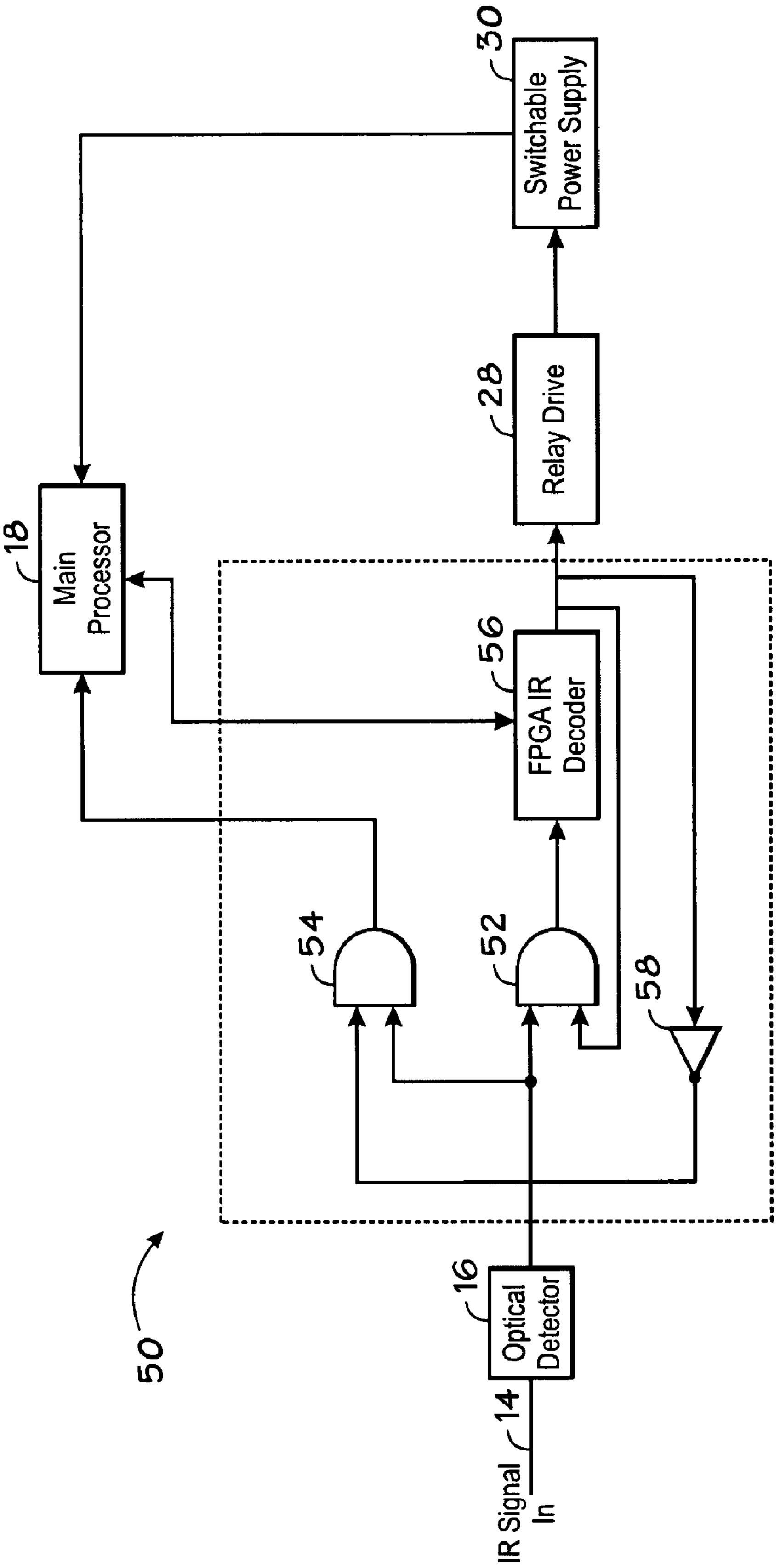
FIG. 2 is schematic diagram of an IR decoder circuit in accordance with an exemplary embodiment of the present invention.

FIG. 2 is a schematic diagram of an IR decoder circuit 50 in accordance with an exemplary embodiment of the present invention. In the illustrated embodiment the circuit 50 is part of FPGA of an electronic device, such as the FPGA 20 of electronic device 10 of FIG. 1. As further depicted by FIG. 2, the circuit 50 may be coupled to additional components described above with regard to the electronic device 10. Such components include the detector 16, main processor 18, relay drive 28 and power supply 30.

Generally, the circuit 50 includes AND gates 52 and 54, an FPGA IR decoder 56 and an inverter 58. The AND gates 52 and 54 are coupled in parallel to the detector 16. The AND gate 54 is further coupled in series to the main processor 18 and AND gate 52 is further coupled in series to the FPGA IR decoder 56. The FPGA IR decoder 56 is coupled in parallel to the relay drive 28 and to the main processor 18. Further, an inverter 58 is coupled between FPGA IR decoder 56/relay drive 28 and the AND gate 54. The relay drive 28 is coupled to the power supply 30 which, in turn is coupled to the main processor 18.

Hence, when implemented in an electronic device, such as the electronic device 10 of FIG. 1, the circuit 50 splits IR decoding functionality between the FPGA 20 and the main processor 18. In accordance with the present technique, when the device 10 is switched off, it is set to a low power mode in which only the circuit 50 may be operable within electronic device 10. In such a mode, the circuit 50 maintains the relay drive in an "off" state such that the main processor 18 and systems 22-26 (FIG. 1) are disconnected from the power supply 30. As a result, incoming IR signals are intercepted by the detector 16 and are routed to gates 52 and 54. Because the main processor is disconnected from the power supply 30 when the circuit 50 is placed in the "off" state, all incoming IR signals 14 are processed by the gate 52 and, thereafter, by the FPGA IR decoder 56.

Further processing of the incoming IR signals 14 entails parsing those signals into what are known as a "preamble" portion and a "command" portion, where each portion typically comprises a certain number of bits, such as 12, 24, etc. The FPGA IR decoder 56 is adapted to compare the bits of the preamble and/or command of the IR signal to predefined values stored in a look-up table (LUT) included in the FPGA IR decoder 56. Such comparison determines whether bit-values of the command and/or preamble match the predefined values of the LUT which may be a precondition for changing the power mode of the circuit 50. For example, a matching between the "command" and the predefined value stored on the LUT of the FPGA IR decoder 56 produces a signal switching the relay drive 28 to an "on" state, whereby the power supply 30 powers the main processor 18 so that it may be fully operational. However, if no matching exists between the "command" and the LUT, the relay drive remains in an "off" state.

By the same token, a matching of the "preamble" to a LUT stored on the FPGA IR decoder 56 produces a signal that is routed, via inverter 58, to gate 54 to be further processed by the main processor 18. At this point, the electronic device operates at a full power mode in which the main processor 18 takes full control over IR decoding, while the circuit 50 is idle. When the electronic device 10 is turned off, as dictated by a certain "command" and/or a "preamble" processed by the main processor 18, the relay drive 28 may be set to an "off" state, thereby disconnecting the power supply 30 from the main processor 18 and activating circuit 50.

Figure 3:
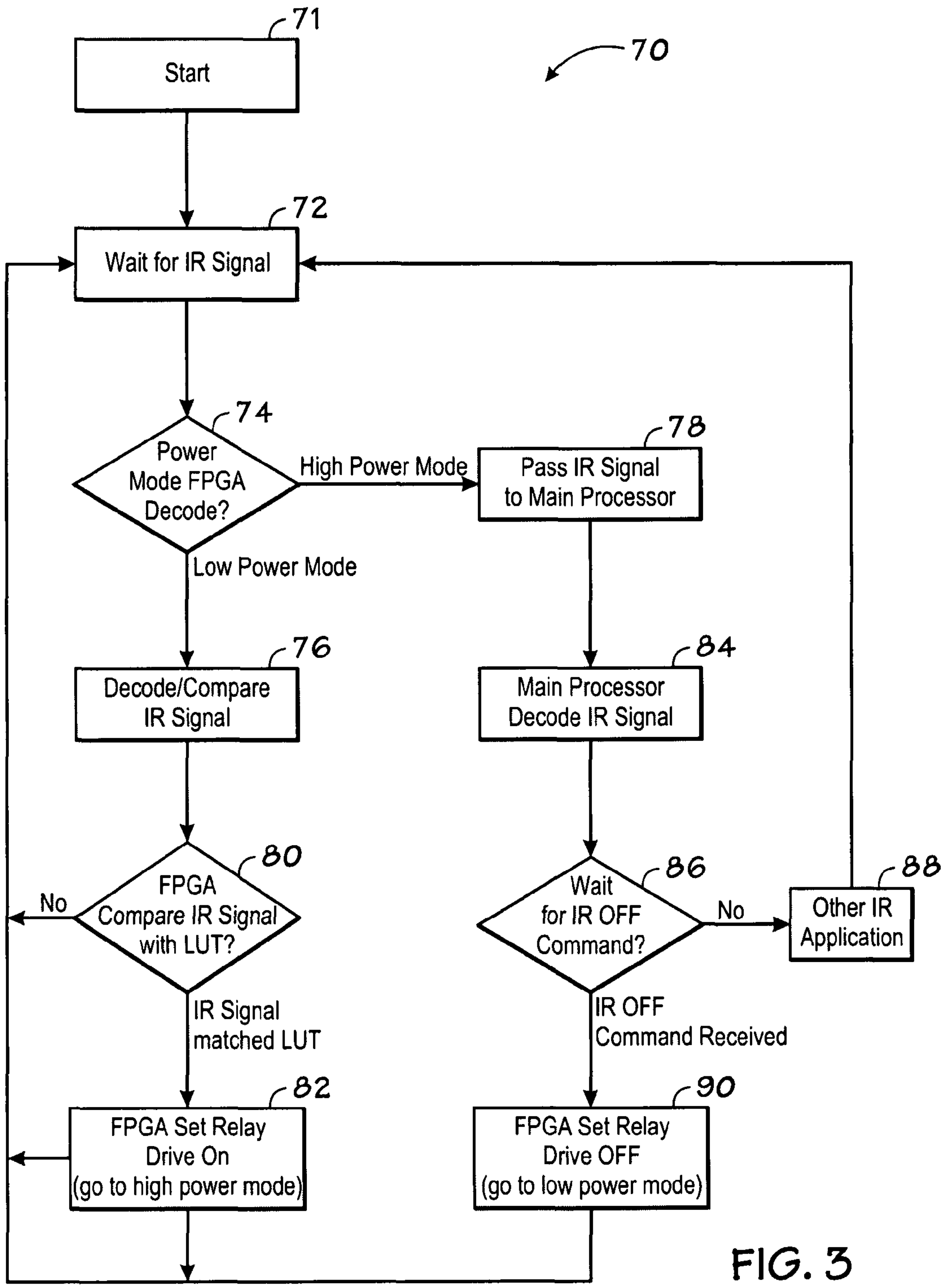
FIG. 3 is a flow chart of a method of operation of an IR decoder in accordance with an exemplary embodiment of the present invention.

FIG. 3 is a flow chart 70 of a method of operation of an IR decoder in accordance with an exemplary embodiment of the present invention. The method 70 provides steps in which functionality of IR decoding is split between the device's main processor 18 and FPGA's 20. Thus, the method 70 may be implemented by the IR decoding circuit 50 of the electronic device 10 described above with reference to FIGS. 1 and 2. The method begins at block 71. Thereafter, the method proceeds to block 72 in which IR signals encoded with certain commands and/or functions are received by an IR decoder. Such IR signals are then forwarded to an IR decoding circuit, such as circuit 50 (FIG. 2), for further processing.

Accordingly, the method 70 proceeds to decision junction 74, whereby the power mode of the electronic device is determined. Stated otherwise, decision junction 74 determines whether to forward incoming IR signals to the main processor (e.g., 18, FIG. 2) of the electronic device or to the FPGA IR decoder (e.g., 56, FIG. 2) of the IR decoding circuit 50. For example, when the electronic device operates in a low power mode, incoming IR signals are forwarded and compared to an LUT stored on the FPGA IR decoder. However, when the electronic device (e.g., 10 FIG. 1) is turned on, the electronic device is placed in a high power mode and the logic level of the FPGA IR decoding circuit changes such that it becomes idle. Consequently, the main processor of the electronic device acquires all IR decoding functionalities. In this situation, all incoming IR signals are forwarded to the main processor of the electronic device and subsequent main processor IR decoding is implemented.

Hence, if at decision junction 74 it is determined that the power mode is low, the method proceeds to block 76 in which the IR signals are provided to an FPGA IR decoder (e.g., 56, FIG. 2). Accordingly, at block 76 IR signals are decoded and compared by the FPGA IR decoder to existing values stored on the LUT. However, if the power mode is high, meaning the electronic device (e.g., 10, FIG. 1) is turned on the method 70 proceeds to block 78 in which all incoming IR signals are directed to the main processor so that it may decode all incoming IR signals.

Returning to block 76, incoming IR signals are parsed, in part, into a "preamble" portion and a "command" portion, such that each of those portions are represented by certain number of bits. These portions of the IR signal may then be compared to predefined values stored in a look-up table (LUT). Such a comparison may determine whether the aforementioned portions of the IR signal produces an output signal changing the power mode of the IR decoding circuit. Accordingly, from block 76 the method 70 proceeds to decision junction 80 to determine whether, for example, the "command" portion of the IR signal matches the predefined value stored in the LUT. If so, the method proceeds to block 82 in which a relay drive, such as the relay drive 28 (FIG. 2), is set to an on state and main processor IR decoding is implemented. However, if no matching exists between the "command" portion of the IR signal and the predefined value stored on the LUT of the comparator, the logic level of the FPGA IR decoding circuit remains unchanged and the FPGA IR decoding remains implemented.

Returning to block 78 where the electronic device operates in high power mode, the method 70 proceeds to block 84 and the main processor acquires all IR decoding functionalities. Thus, upon reception of further IR signals, the method 70 proceeds to decision junction 86 to determine the nature of the command contained within a received IR signal. If the received IR signal fails to include an "off" command, that is, a command switching the electronic device from a high power mode to a low power mode, then the method 70 proceeds to block 88. Accordingly, at block 88 IR signals other than ones including an "off" command are processed by the device's main processor. From block 88 the method 70 loops back to block 72.

However, if at decision junction 86 it is determined that the received IR signal contains an "off" command, the method 70 proceeds to block 90. Accordingly, at block 90 the logic level of the FPGA changes thereby switching the relay drive (e.g., relay drive 28, FIG. 2) to an "off" state, in which FPGA IR decoding is implemented as the electronic device is switched to low power mode.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A video unit configured to receive infra-red (IR) signals, comprising:

a first IR decoder configured to decode the IR signals when the video unit is operating in a first power mode, wherein the first power mode includes:

the video unit being connected to a first power supply and receiving power from the first power supply; and the video unit controlling systems of the video unit; and a second IR decoder configured to decode the IR signals when the video unit is operating in a second power mode, wherein the second power mode includes:

the video unit not receiving power from the first power supply; and the second IR decoder receiving power from a second power supply.

2. The video unit of claim 1, wherein the video unit comprises a television (TV), a digital versatile video recorders (DVDR), a computer, a video cassette recorder (VCR), a video camera, a personal digital assistant (PDA), or a cell phone.

3. The video unit of claim 1, wherein the first IR decoder comprises a computer processing unit and the second IR decoder comprises a field programmable gate array (FPGA).

4. The video unit of claim 1, wherein the second power mode is a low power mode compliant with an "Energy Star" industry standard.

5. The video unit of claim 1, wherein the second IR decoder comprises an FPGA IR decoder coupled to a relay drive, wherein the relay drive is configured to switch the video unit between the first power mode and the second power mode.

6. The video unit of claim 5, wherein the FPGA IR decoder is configured to compare portions of the IR signal to predefined values stored in a look-up table (LUT) to determine whether to switch the video unit from the second power mode to the first power mode.

7. The video unit of claim 1, wherein the first IR decoder and the second IR decoder are separate from one another.

8. The video unit of claim 1, wherein the first power mode corresponds to a first logic level of the second IR decoder and the second power mode corresponds to a second logic level of the second IR decoder.

9. A method for processing infra-red (IR) signals of a video unit, comprising:

receiving an infra-red signal comprising a plurality of bits;

comparing values of the bits to predefined values stored in a look-up table (LUT); and changing a logic level of a first IR decoding circuit if the values of the bits comprising the IR signal match the predefined values, wherein changing the logic level of the first IR decoding circuit corresponds to the video unit receiving power from a power supply and controlling systems of the video unit.

10. The method of claim 9, comprising determining the logic level of the first IR decoding circuit before comparing the values of the bits comprising the IR signal to the predefined values.

11. The method of claim 10, comprising comparing the values of the bits comprising the IR signal only if the logic level of the first IR decoding circuit is set to a first level.

12. The method of claim 11, comprising routing the IR signal to a second IR decoding circuit if the logic level of the first IR decoding circuit is different from the first level.

13. The method of claim 12, wherein the first and second IR decoding circuits are separate.

14. The method of claim 9, wherein the IR signal comprises a command portion and a preamble portion.

15. The method of claim 14, comprising changing the logic level of the first IR decoding circuit only if values of the bits of the command portion of the IR signal match predefined command values.

16. A video unit, comprising:

a computer processing unit configured to decode IR signals when the video unit is operating in a first power mode, wherein the first power mode includes:

the video unit being connected to a first power supply and receiving power from the first power supply; and the video unit controlling systems of the video unit; and an IR decoder configured to decode the IR signals when the video unit is operating in a second power mode, wherein the second power mode includes:

the video unit not receiving power from the first power supply; and the IR decoder receiving power from a second power supply.

17. The video unit of claim 16, wherein the systems of the video unit comprise a display system, a sound system, a control system, a power supply, a photo detector, or a combination thereof.

18. The video unit of claim 16, wherein the IR decoder is a field programmable gate array (FPGA).

19. The video unit of claim 16, wherein the second power mode is a low power mode compliant with an "Energy Star" industry standard.

20. The video unit of claim 16, wherein the IR decoder comprises a comparator coupled to a relay drive, wherein the relay drive is configured to switch the video unit between the first power mode and the second power mode.

* * * * *